United States Patent [19]
Wiersdorff et al.

[11] 3,920,692
[45] Nov. 18, 1975

[54] PRODUCTION OF MESOTETRAARYLPORPHINES

[75] Inventors: Walter Wielant Wiersdorff, Ludwigshafen; Martin Fischer, Ellerstadt, both of Germany

[73] Assignee: BASF Aktiengesellschaft, Ludwigshafen (Rhine), Germany

[22] Filed: Feb. 19, 1974

[21] Appl. No.: 443,414

[30] Foreign Application Priority Data
Feb. 20, 1973 Germany............................ 2308252

[52] U.S. Cl. ............................................... 260/314
[51] Int. Cl.² ......................................... C09B 47/00
[58] Field of Search .................................... 260/314

Primary Examiner—Harry I. Moatz
Attorney, Agent, or Firm—Johnston, Keil, Thompson & Shurtleff

[57] ABSTRACT

Mesotetraarylporphines are produced by reaction of pyrrole with an aromatic aldehyde in the presence of an organic substance having a dehydrogenating effect as an oxidizing agent and of a lower aliphatic carboxylic acid. The mesotetraarylporphines are suitable as such or in the form of their metal complexes particularly as photooxidation sensitizers.

7 Claims, No Drawings

PRODUCTION OF MESOTETRAARYLPORPHINES

The invention relates to an improved process for the production of a mesotetraarylporphine by reaction of pyrrole with an aromatic aldehyde in the presence of an oxidizing agent which is an organic substance having a dehydrogenating effect.

The biological importance of compounds derived from porphine has resulted in many attempts to prepare porphines and particularly mesotetraarylporphines commercially. The synthesis of mesotetraarylporphines from pyrrole and benzaldehyde in propionic acid as a solvent in the presence of atmospheric oxygen as oxidizing agent which gives yields of about 20% of the pure product and which is disclosed by A.D. Adler et al in J. Heterocycl. Chem. 5 (1968), pages 669 to 678 may be regarded as the best current route to porphine. A particular advantage of propionic acid as the reaction medium is that the porphine is obtained immediately in crystalline form from the reaction and does not first have to be isolated by a troublesome method. The yield falls off considerably according to the literature when air is not supplied. Inorganic oxidizing agents such as sodium peroxide, sodium persulfate or potassium permanganate do not cause any increase but in some cases even cause a decrease in yield as has been established by experiments to raise the yields of 20% which are inadequate for an industrial synthesis (J. Heterocycl. Chem. 5 (1968), table on page 675).

We have now found that a mesotetraarylporphine of the formula:

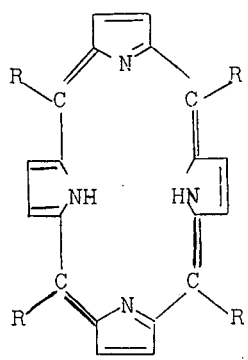

in which R is phenyl or phenyl bearing one or more than one of the substituents chlorine, alkyl or alkoxy of 1 to 4 carbon atoms per alkyl or alkoxy, are advantageously obtained by reaction of pyrrole with an aromatic aldehyde RCHO in the presence of an aliphatic carboxylic acid of 2 to 8 carbon atoms and an oxidizing agent by using as the oxidizing agent an organic dehydrogenating agent.

The advantages of the improved process lie in the increased yield and the lower cost. It is immaterial whether the reaction is carried out in an inert gas atmosphere or with access of air. Having regard to the results disclosed in the literature with inorganic oxidizing agents the increase in the yield produced by adding an organic oxidizing agent in accordance with the invention is surprising.

The substituents chlorine, alkyl and alkoxy with one to four carbon atoms per alkyl in the radicals R of the said mesotetraarylporphine formula are particularly suitable because of industrial accessibility and the smooth course of the reaction.

Examples of suitable starting aldehydes in addition to benzaldehyde, preferably those having up to two substituents, are anisaldehyde, o-tolylaldehyde, p-tolylaldehyde, o-chlorobenzaldehyde, p-chlorobenzaldehyde, 2,4-dichlorobenzaldehyde and 3,4-dichlorobenzaldehyde. Organic dehydrogenating agents which are suitable as oxidizing agents for the present reaction include compounds conventionally used for dehydrogenation reactions as for example those described in Fieser & Fieser, "Reagents for Organic Synthesis", volumes 1 to 3. It is advantageous to use the following substances as such organic dehydrogenating agents: quinones such as p-benzoquinone, o-chloranil, p-chloranil, 2,3-dichloro-5,6-dicyano-1,4-benzoquinone, o-naphthoquinone, p-naphthoquinone, phenanthrenequinone and anthraquinone; azo compounds such as the diethyl ester of an azodicarboxylic acid; stable radicals such as diphenylpicrylhydrazyl; tritylium salts such as tritylium sulfate; and nitro compounds such as nitrobenzene.

The reaction according to the invention may be carried out in any solvent which is not susceptible to oxidation, for example in hydrocarbons such as benzene, toluene, xylene or cyclohexane provided that a carboxylic acid is present besides the organic dehydrogenating agent. It is preferred to use propionic acid or especially a solvent mixture containing propionic acid, but other lower aliphatic carboxylic acids (i.e. which are liquid at ambient temperature) such as acetic acid, n-butyric acid, isobutyric acid, n-valeric acid or ethylhexanoic acid may also be used. It is convenient to use from 0.1 to 1.0 and preferably from 0.2 to 0.6 oxidation equivalent of the organic dehydrogenating agent based on pyrrole. Although deviations of up to the ratio 1:2 do not have any significant effect on the reaction it is most economical to use the pyrrole and the aromatic aldehyde in about equimolar proportions.

The pyrrole and aromatic aldehyde may be used in concentrations of from 0.01 to 1.5 moles per liter of solvent. It is preferred to use from 0.4 to 1.1 moles per liter of solvent and consequently in a much higher concentration range than possible hitherto in the absence of an organic dehydrogenating agent.

All the reactants may be introduced at the same time into the preheated reaction medium. It is more favorable however first to introduce some of the pyrrole and aldehyde, preferably from 10 to 50% by weight of the total amount in each case into the reaction zone, if desired in portions, and only then to introduce the dehydrogenating agent, if desired in portions, while at about the same time adding the remainder of the pyrrole and of the aldehyde. The dehydrogenating agent may also be added after the whole of the aldehyde and pyrrole have been introduced. The starting materials are most conveniently added in pure form. They may however first be dissolved or suspended in a solvent, preferably in propionic acid, and introduced into the reaction zone in this form. The starting materials pyrrole and aldehyde may be introduced into the reaction vessel separately or mixed together.

The reaction is generally carried out at a temperature of from 50°C up to the boiling temperature of the solvent used.

The most favorable temperature range for the formation of the porphine is from 70° to 150°C. Temperature control is particularly convenient at the boiling point of the solvent or solvent mixture. After all the reactants have been united the whole is heated for from a few minutes to one hour to complete the reaction. After cooling the porphine crystallizes out and can be isolated by filtering it off and washing with a suitable solvent or an alcohol, for example methanol; it is obtained in high purity. The yield is generally from 30 to 40% based on the starting materials.

The synthesis may be carried out with access of air or in an inert gas atmosphere at atmospheric or superatmospheric pressure. Compounds prepared according to the invention are suitable as such or in the form of their metal complexes as photooxidation sensitizers, for fuel cells and as starting materials for further compounds of the porphine skeleton.

The following Examples illustrate the invention. The parts and percentages in the Examples are by weight. Parts by volume bear the same relation to parts by weight as the liter to the kilogram.

EXAMPLE 1

40 parts by volume of propionic acid is boiled in a stirred vessel. A mixture of 2.7 parts of pyrrole and 4.0 parts of benzaldehyde is allowed to flow in over 60 minutes while stirring. Fifteen minutes after beginning the supply a start is made in metering in a solution of 1.58 parts of naphthoquinone in 20 parts by volume of propionic acid at a rate of 0.450 part by volume per minute. After the approximately simultaneous ending of the supply of the starting materials the whole is boiled under reflux for 30 minutes and then cooled to about 5°C. The product is suction filtered, washed with cold methanol and dried. 2.15 parts of pure mesotetraphenylporphine is obtained in crystalline form. This is a yield of 35%.

EXAMPLE 1a

The procedure of Example is repeated but with the propionic acid replaced by isobutyric acid. The tetraphenylporphine is obtained in a yield of 30%.

EXAMPLE 2

27 parts of pyrrole and 40 parts of benzaldehyde are added over 4 to 5 minutes to 1000 parts by volume of boiling propionic acid. Five minutes later 15.8 parts of naphthoquinone is added and boiling is continued for another thirty minutes. After cooling and filtration 21 parts of pure tetraphenylporphine is obtained. The yield is 34%.

EXAMPLE 3

The procedure of Example 2 is repeated but the naphthoquinone is replaced by 10.8 parts of p-benzoquinone. The tetraphenylporphine is obtained in a yield of 32%.

EXAMPLE 4

The procedure of Example 2 is adopted but the naphthoquinone is replaced by 24.6 parts of chloranil. The tetraphenylporphine is obtained in a yield of 32%.

EXAMPLE 5

The procedure of Example 2 is repeated but 12.3 parts of nitrobenzene is used instead of naphthoquinone. The tetraphenylporphine is obtained in a yield of 26%.

EXAMPLE 6

27 parts of pyrrole and 40 parts of benzaldehyde are introduced while stirring into 500 parts by volume of propionic acid at 115°C in 20 minutes. Five minutes after the beginning of the addition of these two substances a start is made in allowing a solution of 15.8 parts of naphthoquinone in 100 parts by volume of propionic acid to flow in over a period of 15 minutes. The whole is kept at 115°C for another 35 minutes, cooled and the solid substance is suction filtered and washed with propionic acid. After drying 19.8 parts of tetraphenylporphine is obtained; the yield is 32%.

EXAMPLE 7

27 parts of pyrrole and 60.5 parts of anisaldehyde are introduced with stirring into 400 parts by volume of propionic acid at 135°C in 60 minutes. Fifteen minutes after commencing to add these two substances a solution of 15.8 parts of naphthoquinone in 20 parts by volume of propionic acid is allowed to flow in over a period of 45 minutes. The procedure is otherwise the same as in Example 6. 26.5 parts of tetra-(p-methoxyphenyl)-porphine is obtained. The yield is 36%.

Comparative EXAMPLE 1

27 parts of pyrrole and 50 parts of benzaldehyde are added to 1500 parts by volume of propionic acid which is boiling with access of air. The whole is boiled for another 30 minutes, allowed to cool, and the tetraphenylporphine is suction filtered and washed with methanol. 12.5 parts of crystalline substance is obtained, i.e. a yield of 20%.

Comparative EXAMPLE 2

Comparative Example 1 is repeated in a flask half filled with air which is attached to a gas burette filled with air. The volume of gas does not change during the reaction. After the said operation 12.5 parts of tetraphenylporphine is obtained, i.e. a 20% yield.

Comparative EXAMPLE 3

Comparative Example 1 is repeated while gassing with pure nitrogen. 12.5 parts of tetraphenylporphine is obtained, i.e. a yield of 20%.

We claim:
1. An improved process for the production of a mesotetraarylporphine of the formula:

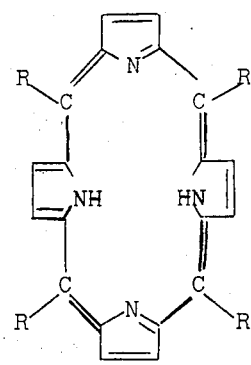

in which R is phenyl or phenyl bearing one or more than one of the substituents chlorine, alkyl or alkoxy of 1 to 4 carbon atoms per alkyl or alkoxy by reaction of pyrrole with an aromatic aldehyde RCHO in the presence of an alkanoic acid of 2 to 8 carbon atoms or a mixture of said alkanoic acid with an inert organic solvent and an oxidizing agent wherein the improvement comprises using an organic dehydrogenating agent selected from the group consisting of p-benzoquinone, o-chloranil, p-chloranil, 2,3-dichloro-5,6-dicyano-1,4-benzoquinone, o-naphthoquinone, p-naphthoquinone, phenanthrenequinone, anthraquinone, the diethyl ester of an azodicarboxylic acid, diphenylpicrylhydrazyl, tritylium sulfate and nitrobenzene as the oxidizing agent.

2. A process as claimed in claim 1 wherein from 0.1 to 1.0 equivalent of the organic dehydrogenating agent is used to 1 mole of pyrrole.

3. A process as claimed in claim 1 wherein the pyrrole and the aromatic aldehyde are introduced in portions into the reaction zone and after one-tenth to one-half of the weight of the said starting materials has been introduced the organic dehydrogenating agent is added.

4. A process as claimed in claim 1 wherein the reaction is carried out in propionic acid or an inert solvent essentially containing propionic acid.

5. A process as claimed in claim 1 wherein the reaction is carried out at a temperature of from 70° to 150°C.

6. A process as claimed in claim 1 wherein naphthoquinone is used as the organic dehydrogenating agent.

7. A process as claimed in claim 1 wherein o-chloranil or p-chloranil is used as the dehydrogenating agent.

* * * * *